United States Patent
Rong et al.

(10) Patent No.: US 7,256,929 B1
(45) Date of Patent: Aug. 14, 2007

(54) SEMICONDUCTOR WAVEGUIDE BASED HIGH SPEED ALL OPTICAL WAVELENGTH CONVERTER

(75) Inventors: Haisheng Rong, Fremont, CA (US); Mario J. Paniccia, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 14 days.

(21) Appl. No.: 11/336,285

(22) Filed: Jan. 20, 2006

(51) Int. Cl.
*G02F 2/02* (2006.01)
*G02F 1/365* (2006.01)

(52) U.S. Cl. .................................. 359/326; 359/332

(58) Field of Classification Search ........ 359/326–332; 385/129, 131; 372/21, 22
See application file for complete search history.

(56) References Cited

U.S. PATENT DOCUMENTS 6,710,911 B2 * 3/2004 LoCascio et al. .......... 359/326

2006/0159131 A1 * 7/2006 Liu et al. ..................... 372/3

* cited by examiner

*Primary Examiner*—Hemang Sanghavi
(74) *Attorney, Agent, or Firm*—Blakely, Sokoloff, Taylor & Zafman LLP

(57) ABSTRACT

A semiconductor-based all optical wavelength converter is disclosed. An apparatus according to aspects of the present invention includes an optical waveguide disposed in semiconductor material. An optical pump source is optically coupled to direct an optical pump beam having a first wavelength into the optical waveguide. The optical waveguide is further optically coupled to receive an input optical beam having a second wavelength. The optical waveguide is optically coupled to generate an output optical beam having a third wavelength in response to the optical pump beam and the input optical beam in the optical waveguide. A diode structure is disposed in the optical waveguide. The diode structure includes at least P and N regions. The diode structure is biased to generate an electric field to remove free carriers from an optical path through the optical waveguide generated in response to two photon absorption in the optical waveguide.

26 Claims, 6 Drawing Sheets

SEMICONDUCTOR WAVEGUIDE BASED HIGH SPEED ALL OPTICAL WAVELENGTH CONVERTER

BACKGROUND OF THE INVENTION

1. Field of the Invention

Embodiments of invention relate generally to optical devices and, more specifically but not exclusively relate to semiconductor-based optical wavelength conversion.

2. Background Information

The need for fast and efficient optical-based technologies is increasing as Internet data traffic growth rate is overtaking voice traffic pushing the need for fiber optical communications. Transmission of multiple optical channels over the same fiber in the dense wavelength-division multiplexing (DWDM) system provides a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers and wavelength converters.

A wavelength converter is a device that can be used to covert the wavelength of one optical beam to a different wavelength. Wavelength converters can be used to address the needs in future high speed, multi-wavelength optical networks. Known wavelength conversion techniques such as for example those that have been used in $LiNbO_3$ crystal based wavelength converters have suffered from issues such as photorefractive damage and high cost.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for converting a wavelength of an optical beam are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

Figure 1:
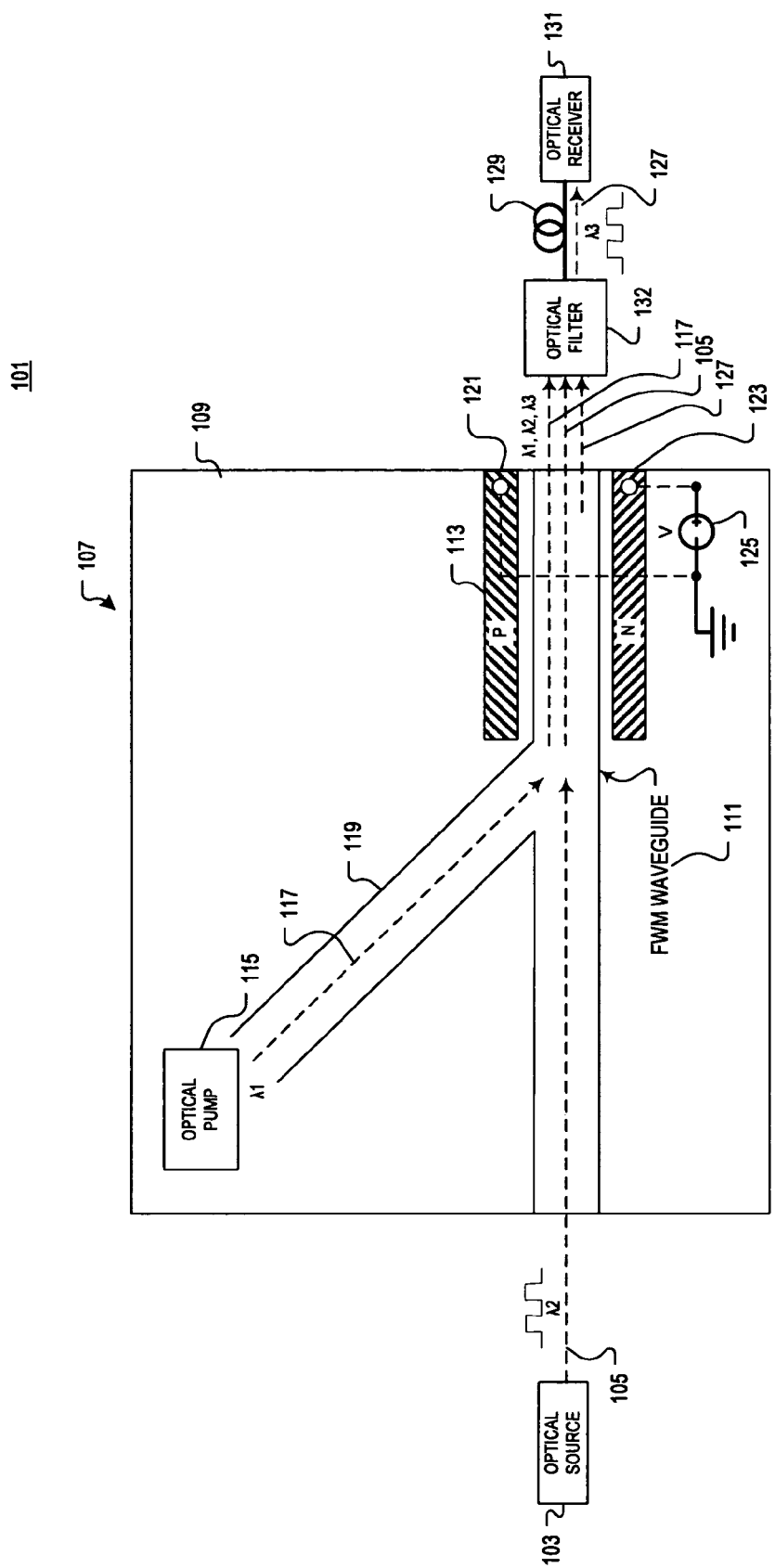
FIG. 1 is a block diagram illustrating an optical system including an example of a high speed all optical wavelength converter in accordance with the teachings of the present invention.

FIG. 1 illustrates generally a system including an optical source coupled to transmit an optical beam to an optical receiver through an example of an optical device 107 in accordance with the teachings of the present invention. In particular, FIG. 1 shows system 101 including optical source 103 directing an input optical beam 105 into an optical waveguide 111 included in an optical device 107. As will be discussed, in one example, optical waveguide 111 is a four-wave mixing (FWM) optical waveguide as high speed all optical wavelength conversion is realized by utilizing a four-wave mixing effect in accordance with the teachings of the present invention.

In the illustrated example, optical device 107 is a semiconductor-based high speed all optical wavelength converter in accordance with the teachings of the present invention. As shown in the illustrated example, input optical beam has a wavelength of $\lambda 2$ and information or data is encoded on input optical beam 105. As will be discussed, an output optical beam 127 having a different wavelength of $\lambda 3$ is generated in optical waveguide 111 and exits from an output of FWM optical waveguide. As shown, the data or information that was encoded on input optical beam 105 is also encoded on output optical beam 127. In one example, output optical beam 127 is directed from FWM optical waveguide through an optical filter 132 and is then transmitted through a standard optical fiber 129 to optical receiver 131.

FIG. 1 shows that optical device 107 includes an optical waveguide 111 disposed in the semiconductor material 109 that is optically coupled to receive input optical beam 105. In one example, semiconductor material 109 includes silicon. Optical waveguide 111 is etched in the semiconductor material 109, which is also integrated with a diode structure 113. In one example, the diode structure 113 includes a p-i-n diode that is biased with voltage 125 to remove free carriers from an optical path through optical waveguide 111 in accordance with the teachings of the present invention. The free carriers are present along the optical path of optical waveguide 111 due to two photon absorption occurring within optical waveguide 111.

The example illustrated in FIG. 1 shows that optical waveguide 111 is also optically coupled to receive a pump optical beam 117 from an optical pump 115 through an optical waveguide 119 disposed in the semiconductor material 109. In the illustrated example, the pump optical beam 117 has a pump wavelength λ1, which is a different wavelength than the wavelength λ2 of the input optical beam 105 or the wavelength λ3 of output optical beam 127. In one example, optical pump 115 is a continuous wave (CW) laser such that optical pump beam 117 is a CW laser beam having a wavelength λ1.

In one example, a four-wave mixing effect is employed in the semiconductor material 109 of optical waveguide 111 to convert an optical signal included in input optical beam 105 at wavelength λ2 into a different wavelength λ3. In the illustrated example, the waveguide structure of optical waveguide 111 is has appropriate dimension and design such that optical pump beam 117 and input optical beam 105 are collinearly coupled into optical waveguide 111. Due to a nonlinear interaction between pump optical beam and the input optical beam, a degenerated FWM effect occurs within the semiconductor material 109 of optical waveguide 111 resulting in a new wavelength λ3 being generated for output optical beam 127 in accordance with the teachings of the present invention.

In one example, the wavelengths λ1, λ2 and λ3 of the optical pump beam 117, the input optical beam 105 and output optical beam 127, respectively, satisfy the following relationship:

$$1/\lambda 3 = 2/\lambda 1 - 1/\lambda 2 \tag{1}$$

In other words, a reciprocal of the wavelength of the output optical beam 127 is equal to twice the reciprocal of the wavelength of the pump optical beam 117 minus the reciprocal of the wavelength of the input optical beam 105.

Generally speaking FWM occurs when light of three different wavelengths is launched into a medium, giving rise to a new wave, the wavelength of which does not coincide with any of the others. FWM is a nonlinear optical effect and the third order nonlinear susceptibility is responsible for four-wave mixing processes. When the wavelengths of two of the input waves are identical, such as the pump beam in the example described herein, the term degenerated four-wave mixing is also used.

In addition to the specific examples described herein, it is appreciated that the concept of using FWM process to realize wavelength conversion in semiconductor optical waveguides with a p-i-n diode structure can be generalized. For example, Coherent anti-Stokes Raman Scattering (CARS) is also four-wave mixing process that may be employed to generate the converted output optical beam at the wavelength λ3 in accordance with the teachings of the present invention. It is also sometimes referred to as Raman enhanced degenerated FWM and can be used for wavelength conversion in accordance with the teachings of the present invention. In such an example in silicon, the Raman shift is 15.6 THz. If the optical pump beam 117 wavelength λ1 is chosen to be at 1430 nm for example, an the input optical beam 105 at a wavelength λ2 at 1331 nm can be converted to an output optical beam 127 at a wavelength λ3 at 1545 nm and vice versa by CARS. Since CARS is a resonant process, the inherent conversion efficiency is much higher than non-resonant processes. However, since the larger wavelength separation of these interacting waves, CARS also requires stringent phase matching conditions. This can be achieved by choosing appropriate waveguide dimensions to compensate the material dispersion. Depending on applications, one can determine which form of FWM process that can be used in conjunction with the p-i-n waveguide in accordance with the teachings of the present invention.

Figure 2:
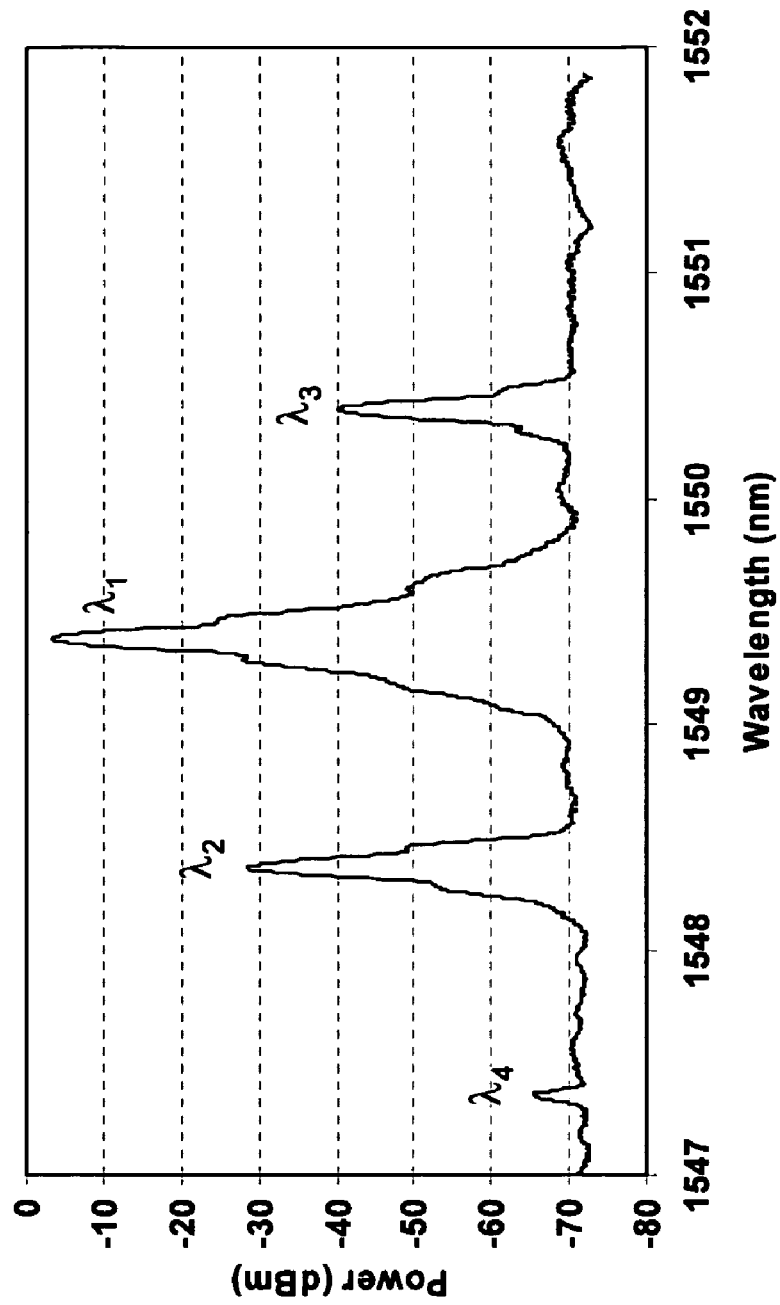
FIG. 2 is a diagram of example measured spectrum of FWM signals from an example high speed all optical wavelength converter illustrating a relationship between the pump ($\lambda_1$), input ($\lambda_2$), and converted ($\lambda_3$) signals in accordance with the teachings of the present invention.

FIG. 2 is a diagram 225 illustrating a relationship of example measured spectrum of FWM signals from an example high speed all optical wavelength converter in accordance with the teachings of the present invention. Diagram 225 of the example of FIG. 2 shows power measured in dBm along the y-axis versus wavelength measured in nm along the x-axis. In the illustrated example, optical pump beam 117 wavelength λ1 is approximately 1549.39 nm and input optical beam 105 wavelength λ2 is approximately 1548.37 nm. In the illustrated example, the degenerated FWM effect in silicon results in converted output signal 127 have a new wavelength λ3 in accordance with the teachings of the present invention. In the illustrated example, output optical beam 127 wavelength λ3 is approximately 1550.41 nm and has a power of approximately −11.5 dB below the input optical beam 105 signal at λ2. It is noted that a converted pump wavelength of λ4 is also created as a result of the FWM effect in the silicon, but the converted pump signal is not utilized. In the illustrated example, the converted pump wavelength λ4 has a power of approximately −−37 dB below the input optical beam 105 signal peak at λ2.

Referring back to the example shown in FIG. 1, pump optical beam 117, input optical beam 105 and output optical beam 127 all exit the optical waveguide 111 together. In the illustrated example, optical filter 132 is optically coupled to the output of optical waveguide 111 to filter out or block or separate the pump optical beam 117 and input optical beam 105 from output optical beam 127. Accordingly, the optical receiver 131 receives only the converted 3 wavelength of output optical beam 127 in accordance with the teachings of the present invention. Therefore, a digital optical data stream or signal carried by the input optical beam 105 is translated or converted into the same data stream but on a new carrier at λ3 in output optical beam 127 in accordance with the teachings of the present invention.

In one example, the conversion efficiency of the converted output optical beam 127 level with respect to the input optical beam 105 level scales with the square of the intensity of the optical pump beam. Smaller waveguide dimensions for optical waveguide 111 also provide tighter light confinement, which gives even higher power density. However, it is noted that nonlinear optical loss will also increase due to free carrier absorption that is generated by two-photon absorption effect in the silicon of semiconductor material 109 at high optical pump beam 117 intensity. For example, free carriers may be generated in silicon as a result of two-photon absorption from the high intensity of optical pump beam 117, which is a third-order nonlinear optical effect. The additional free carriers tend to attenuate the optical power within optical waveguide 111.

Thus, in one example, to improve conversion efficiency, a diode structure 113 is included or integrated in optical waveguide 111 in accordance with the teachings of the present invention. In one example diode structure 113 includes at least a p region 121 and an n region 123. In one example, diode structure 113 is a p-i-n diode including an intrinsic semiconductor or silicon region between p region 121 and an n region 123. In one example, an optical path through optical waveguide 111 is directed through the intrinsic silicon of diode structure 113. In one example, diode structure 113 is reverse biased with voltage 125 to create a strong electric field to reduce the number of free carriers from along the optical path through optical waveguide 111 in accordance with the teachings of the present invention. By reducing the number of free carriers along the optical path through optical waveguide 111, the output power of the resulting output optical beam 127 increased. As a result, optical loss occurring with optical waveguide 111 is significantly reduced and higher conversion efficiency is achieved within optical waveguide 111 in accordance with the teachings of the present invention.

Figure 3:
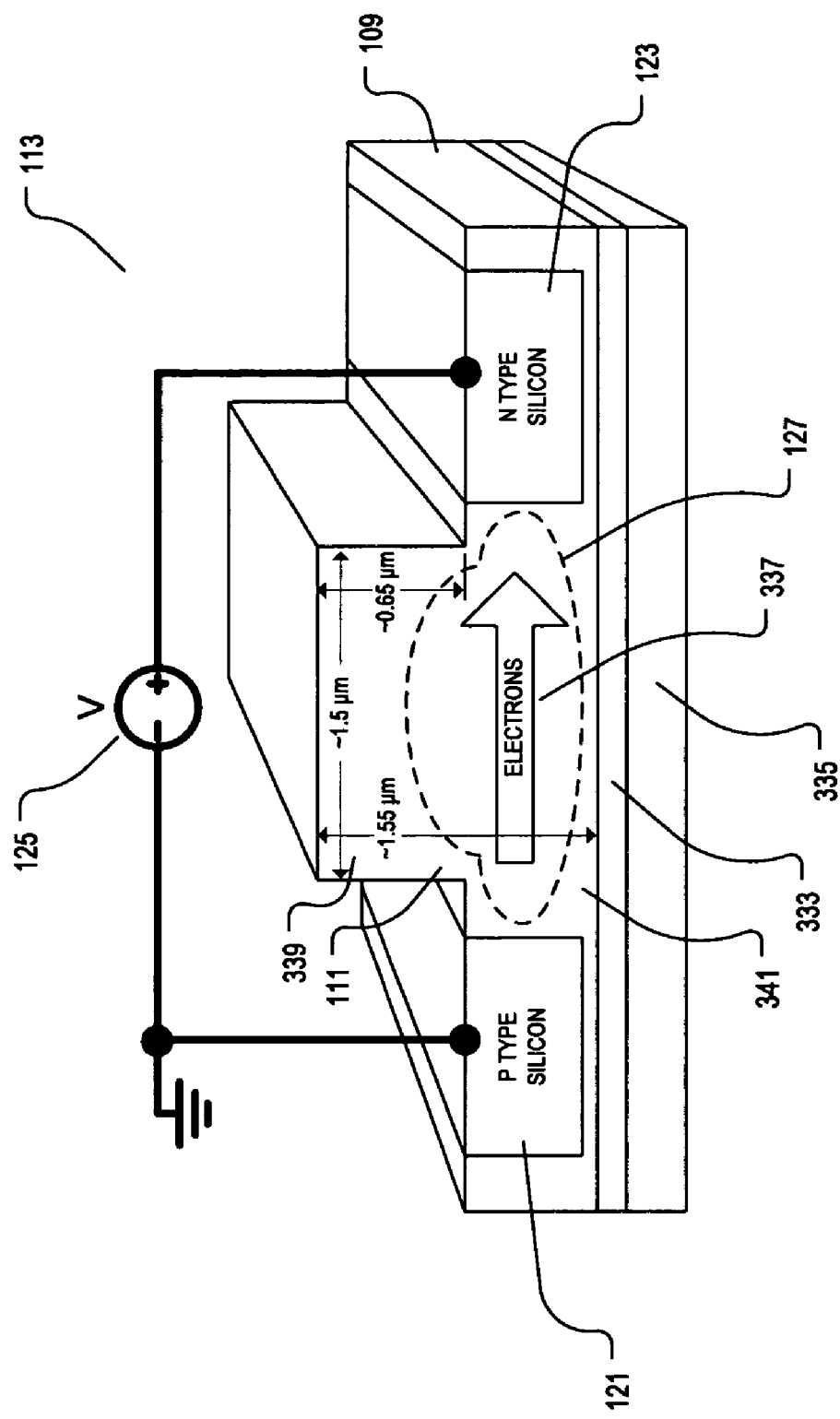
FIG. 3 is a cross section view illustration of semiconductor-based optical waveguide including an example diode structure to reduce two-photon absorption generated carrier lifetimes in the semiconductor waveguide in accordance with the teachings of the present invention.

To illustrate, FIG. 3 is a diagram showing generally a cross-section view of optical waveguide 111 with the p-i-n diode structure 113 in accordance with the teachings of the present invention. As shown in the depicted example, optical waveguide 111 is a rib waveguide including a rib region 339 and a slab region 341. In the illustration, input optical beam 105 is shown propagating through the rib waveguide 111. As shown, the intensity distribution of the optical mode output optical beam 127 is such that the majority of the output optical beam 127 propagates through a portion of the rib region 339 or a portion of the slab region 341 towards the interior of the optical waveguide 111. As also shown with the optical mode of output optical beam 127, the intensity of the propagating optical mode of output optical beam 127 is vanishingly small at the "upper corners" of rib region 339 as well as the "sides" of the slab region 341 of optical waveguide 111.

In the illustrated example, optical waveguide 111 is formed in a silicon-on-insulator (SOI) wafer including the silicon of semiconductor material 109, a silicon substrate layer 335 and a buried oxide layer 333 disposed between the silicon of semiconductor material 109 and silicon substrate layer 335.

In the example shown in FIG. 3, P region 121 and N region 123 of the diode structure 113 disposed in optical waveguide 111 are disposed at opposite lateral sides of the slab region 341 in the optical waveguide 111, outside of the optical mode of the optical beam. As shown, diode structure 113 is a p-i-n diode structure, which includes P doped silicon in P region 121, intrinsic silicon in semiconductor material 109 and N doped silicon in N region 123. In the illustrated example, the optical mode of output optical beam 127 propagates through the intrinsic silicon in semiconductor material 109 of the p-i-n diode structure 113.

The example shown in FIG. 3 shows voltage source 125 is illustrated as being coupled between P region 121 and N region 123. P region 121 is also grounded and voltage source 125 is coupled to apply a voltage between P region 121 and N region 123 to bias the diode structure 113 in accordance with the teachings of the present invention. For example, when reverse biasing the diode structure 113 as shown, an electric field is created between the P region 121 and N region 123 to sweep out free carriers 337, which are electrons and/or holes, from the optical waveguide 111. By sweeping out the free carriers 337, optical loss within optical waveguide 111 is reduced in accordance with the teachings of the present invention.

As shown, FIG. 3 also provides some dimensions for an example p-i-n diode structure 113. In the illustrated example, the width of the rib region 339 is approximately 1.5 μm, the height of the rib region 339 is approximately 0.65 μm and the combined height of the rib region 339 and slab region 341 is approximately 1.55 μm. It is appreciated of course the FIG. 3 is not necessarily drawn to scale and that the example dimensions provided are for explanation purposes and that other dimensions may be utilized in accordance with the teachings of the present invention.

Figure 4:
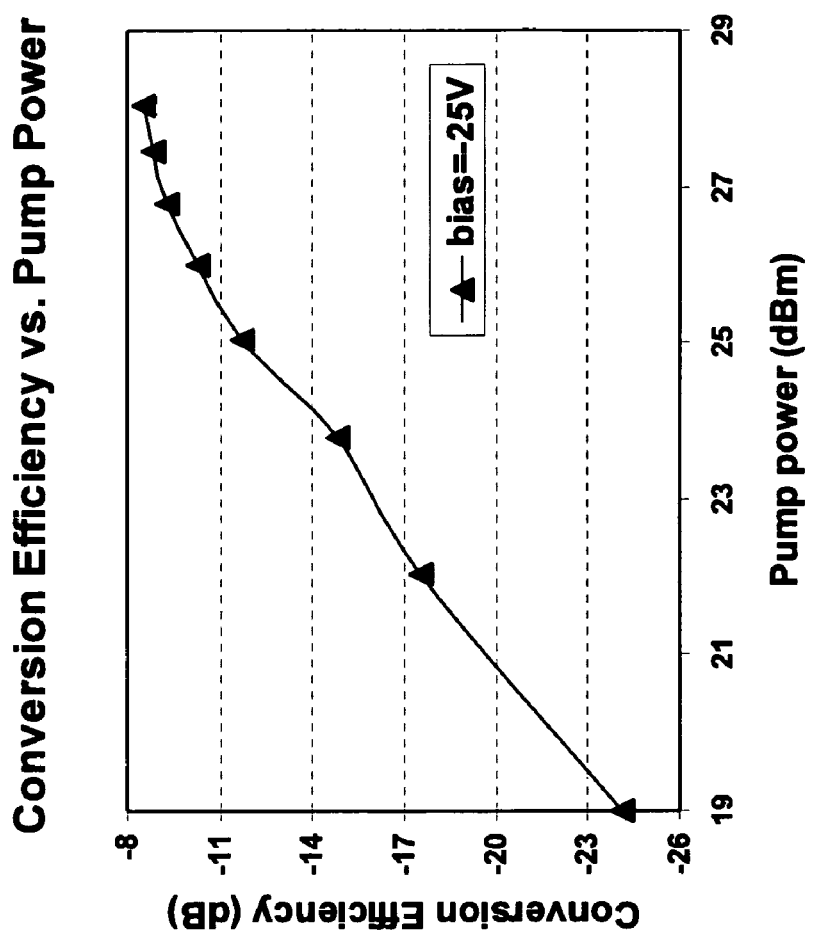
FIG. 4 is a diagram illustrating conversion efficiency versus pump at −25 V bias in an example high speed all optical wavelength converter in accordance with the teachings of the present invention.

FIG. 4 is a diagram 441 illustrating conversion efficiency versus pump and bias in an example high speed all optical wavelength converter in accordance with the teachings of the present invention. In particular, diagram 441 shows conversion efficiency measured in dB along the y-axis as a function of pump power, which is measured in dBm along the x-axis. In the illustrated example, conversion efficiency is the ratio of the peak of the output optical beam 127 at λ3 over the peak level of input optical beam 105 at λ2 (see FIG. 2). Diagram 441 shows that conversion efficiency improves generally with increased pump power. In the illustrated example, a conversion of efficiency of −8.5 dB is achieved with a reverse bias voltage of approximately −25 V and approximately 28 dBm or 40 MW/cm$^2$ pump intensity coupled into FWM optical waveguide in accordance with the teachings of the present invention.

Figure 5A:
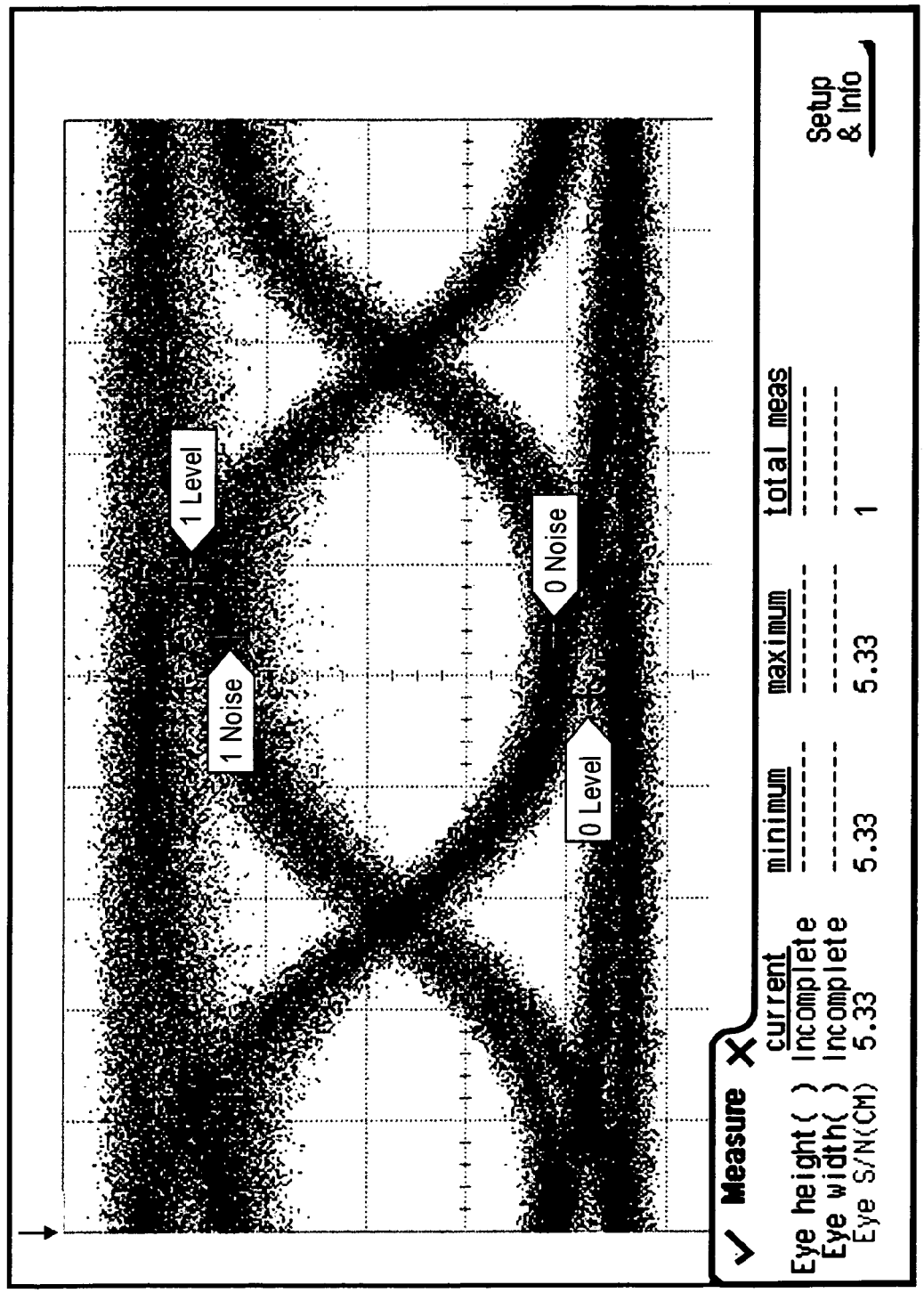
FIG. 5A shows an eye diagram of an input optical signal that is directed into an example high speed all optical wavelength converter in accordance with the teachings of the present invention.
Figure 5B:
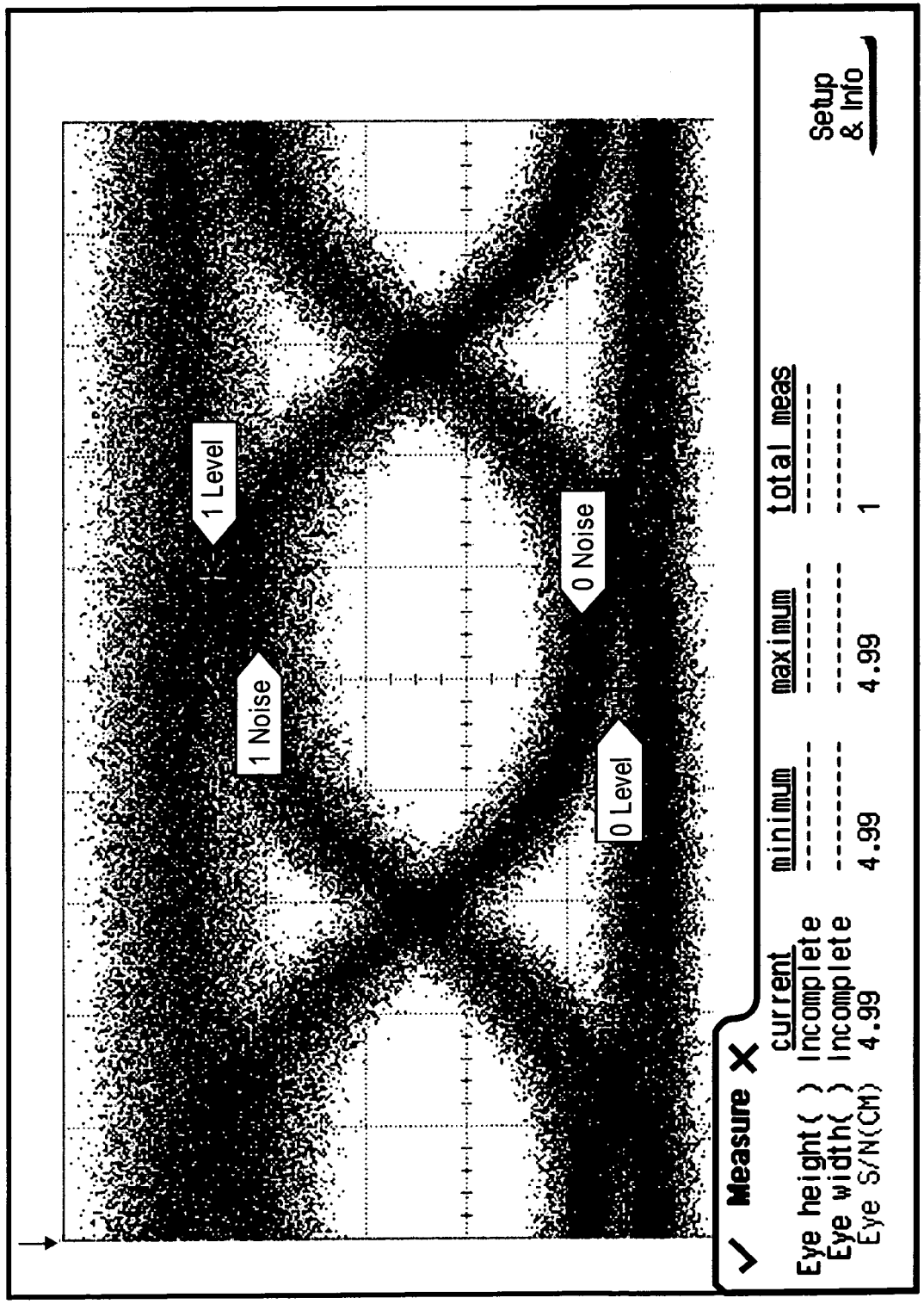
FIG. 5B shows an eye diagram of a converted output optical signal generated from an example high speed all optical wavelength converter in accordance with the teachings of the present invention.

FIG. 5A shows an example eye diagram 545 of an input optical signal that is directed into optical waveguide 111 and FIG. 5B shows an example eye diagram 543 of a resulting converted output optical signal generated within the optical waveguide 111 in accordance with the teachings of the present invention. In the illustrated example, eye diagram 543 is a 10 Gbps pseudo random binary signal (PRBS) at λ2 while eye diagram 545 shows the resulting converted signal at λ3. As can be appreciated, a comparison of eye diagram 543 and eye diagram 545 shows that no waveform distortion can be observed from a high speed all optical wavelength converter including a optical waveguide 111 in accordance with the teachings of the present invention. The decreased signal to noise ratio in FIG. 5B is due to the pump intensity noise and photo detector noise.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize. Indeed, it is appreciated that the specific wavelengths, dimensions, materials, times, voltages, power range values, etc., are provided for explanation purposes and that other values may also be employed in other embodiments in accordance with the teachings of the present invention.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus, comprising:
   an optical waveguide disposed in semiconductor material;
   an optical pump source optically coupled to direct an optical pump beam having a first wavelength into the optical waveguide, the optical waveguide further optically coupled to receive an input optical beam having a second wavelength, wherein the optical waveguide is optically coupled to generate an output optical beam having a third wavelength in response to the optical pump beam and the input optical beam in the optical waveguide; and
   a diode structure disposed in the optical waveguide, the diode structure including at least P and N regions, wherein the diode structure is biased to generate an electric field to remove free carriers from an optical path through the optical waveguide generated in response to two photon absorption in the optical waveguide.

2. The apparatus of claim 1 further comprising an optical filter optically coupled to an output of the optical waveguide, the optical filter to separate the output optical beam from the input optical beam and the optical pump beam.

3. The apparatus of claim 1 wherein the optical pump source comprises a continuous wave (CW) laser.

4. The apparatus of claim 1 wherein the semiconductor material comprises silicon.

5. The apparatus of claim 1 wherein information encoded on the input optical beam at the second wavelength is also encoded on the output optical beam at the third wavelength.

6. The apparatus of claim 1 wherein the third optical beam is generated in response to a four-wave mixing effect of the optical pump beam and the input optical beam in the optical waveguide.

7. The apparatus of claim 6 wherein a reciprocal of the third wavelength is equal to twice a reciprocal of the first wavelength minus a reciprocal of the second wavelength.

8. The apparatus of claim 6 wherein the third optical beam is generated in response to Coherent anti-Stokes Raman Scattering (CARS) of the optical pump beam and the input optical beam in the optical waveguide.

9. The apparatus of claim 1 wherein a diode structure comprises a p-i-n diode having an intrinsic region in which an optical path through the FWM optical waveguide is disposed.

10. The apparatus of claim 1 wherein the optical waveguide comprises a silicon optical rib waveguide.

11. A method, comprising:
    directing an optical pump beam of a first wavelength into an optical waveguide defined in a semiconductor material;
    directing an input optical beam of a second wavelength into the optical waveguide;
    generating an output optical beam having a third wavelength in the optical waveguide in response to the input optical beam and the pump optical beam; and
    removing free carriers generated in response to two photon absorption in the optical waveguide from an optical path in response to an electric field generated by a diode structure in the optical waveguide.

12. The method of claim 11 further comprising filtering the pump optical beam and input optical beam from the output optical beam at an output of the optical waveguide.

13. The method of claim 11 wherein removing the free carriers generated in response to the two photon absorption in the FWM optical waveguide comprises reverse biasing a p-i-n diode integrated in the optical waveguide to generate the electric field.

14. The method of claim 11 wherein directing the optical pump beam of the first wavelength into the optical waveguide comprises generating a continuous wave (CW) laser beam.

15. The method of claim 11 wherein generating the output optical beam having a third wavelength in the optical waveguide in response to the input optical beam and the pump optical beam comprises four-wave mixing the input optical beam and the pump optical beam in the optical waveguide.

16. The method of claim 15 wherein generating the output optical beam having the third wavelength comprises generating a reciprocal of the third wavelength to be equal to twice a reciprocal of the first wavelength minus a reciprocal of the second wavelength.

17. The method of claim 15 wherein generating the output optical beam having a third wavelength in the optical waveguide in response to the input optical beam and the pump optical beam comprises Coherent anti-Stokes Raman Scattering (CARS) the input optical beam and the pump optical beam in the optical waveguide.

18. The method of claim 11 wherein four-wave mixing the input optical beam and the pump optical beam in the FWM optical waveguide to generate the output optical beam having a third wavelength comprises nonlinearly interacting the pump optical beam and the input optical beam with a degenerated FWM effect in silicon of the FWM optical waveguide to generate the output optical beam.

19. The method of claim 11 further comprising encoding information on the input optical beam at the second wavelength, wherein the information is also encoded on the output optical beam at the third optical wavelength.

20. A system, comprising:
    an optical pump source to generate an optical pump beam having a first wavelength;
    an optical source to generate an input optical beam having a second wavelength;
    an optical waveguide disposed in semiconductor material, wherein the optical pump beam and the input optical beam are collinearly coupled into the optical waveguide such that the optical waveguide is optically coupled to generate an output optical beam having a third wavelength in response to the optical pump beam and the input beam in the optical waveguide;
    a diode structure disposed in the optical waveguide, the diode structure including at least P and N regions, wherein the diode structure is biased to generate an electric field to remove free carriers from an optical path through the optical waveguide generated in response to two photon absorption in the optical waveguide;
    an optical receiver optically coupled to receive the output optical beam from the optical waveguide; and
    an optical fiber optically coupled between the optical waveguide and the optical receiver to optically couple the optical receiver to receive the output optical beam from the optical waveguide.

21. The system of claim 20 further comprising an optical filter optically coupled between the optical waveguide and the optical receiver, the optical filter to separate the output optical beam from the input optical beam and the optical pump beam.

22. The system of claim 20 wherein information encoded on the input optical beam at the second wavelength is also encoded on the output optical beam at the third wavelength.

23. The system of claim 20 wherein the diode structure comprises a silicon p-i-n diode.

24. The system of claim 20 wherein the third optical beam is generated in response to a four-wave mixing effect of the optical pump beam and the input optical beam in the optical waveguide.

25. The system of claim 24 wherein a reciprocal of the third wavelength is equal to twice a reciprocal of the first wavelength minus a reciprocal of the second wavelength.

26. The system of claim 24 wherein the third optical beam is generated in response to Coherent anti-Stokes Raman Scattering (CARS) of the optical pump beam and the input optical beam in the optical waveguide.

* * * * *

UNITED STATES PATENT AND TRADEMARK OFFICE
CERTIFICATE OF CORRECTION

PATENT NO.        : 7,256,929 B1                                           Page 1 of 1
APPLICATION NO. : 11/336285
DATED             : August 14, 2007
INVENTOR(S)       : Rong et al.

It is certified that error appears in the above-identified patent and that said Letters Patent is hereby corrected as shown below:

In column 4, at line 30, delete "3" and insert --$\lambda 3$--.

Signed and Sealed this

Eighth Day of April, 2008

JON W. DUDAS
*Director of the United States Patent and Trademark Office*